(12) United States Patent
Ayanampudi et al.

(10) Patent No.: US 7,856,018 B2
(45) Date of Patent: Dec. 21, 2010

(54) PROVISIONING POINT-TO-MULTIPOINT PATHS

(75) Inventors: Krishna M. Ayanampudi, Marlborough, MA (US); Snigdho C. Bardalai, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 435 days.

(21) Appl. No.: 12/118,808

(22) Filed: May 12, 2008

(65) Prior Publication Data

US 2009/0279544 A1 Nov. 12, 2009

(51) Int. Cl.
*H04L 12/28* (2006.01)
(52) U.S. Cl. .................................................... 370/390
(58) Field of Classification Search .................. None
See application file for complete search history.

(56) References Cited

U.S. PATENT DOCUMENTS

| | | | |
|---|---|---|---|
| 6,512,766 B2 | 1/2003 | Wilford | 370/389 |
| 6,704,279 B2 | 3/2004 | Klink | 370/225 |
| 6,879,594 B1 | 4/2005 | Lee et al. | 370/408 |
| 6,947,428 B1 | 9/2005 | Andersson et al. | 370/395.5 |
| 7,020,150 B2 | 3/2006 | Ho et al. | 370/412 |
| 7,317,731 B2 | 1/2008 | Seddigh et al. | 370/419 |
| 7,327,675 B1 | 2/2008 | Goode | 370/230 |
| 7,502,314 B2 * | 3/2009 | Shimizu | 370/227 |
| 7,792,111 B2 * | 9/2010 | Narayanan et al. | 370/390 |
| 2002/0028656 A1 * | 3/2002 | Yemini et al. | 455/41 |

* cited by examiner

*Primary Examiner*—Ayaz R Sheikh
*Assistant Examiner*—Blanche Wong
(74) *Attorney, Agent, or Firm*—Baker Botts L.L.P.

(57) ABSTRACT

Establishing a point-to-multipoint path includes establishing a first label switched path from a source to a first destination, where the first label switched path is represented by a first label set comprising first node-label pairs. A second label switched path is established from the source to a second destination, where the second label switched path is represented by a second label set comprising second node-label pairs. One or more of the second node-label pairs are equivalent to one or more of the first node-label pairs. The first label set and the second label set are combined to establish the point-to-multicast path.

22 Claims, 2 Drawing Sheets

PROVISIONING POINT-TO-MULTIPOINT PATHS

TECHNICAL FIELD

This invention relates generally to the field of communication networks and more specifically to provisioning point-to-multipoint paths.

BACKGROUND

A communication network has paths of nodes through which packets are communicated. A point-to-point path communicates packets from a source to a destination. A point-to-multipoint path communicates packets from a source to more than one destination. In certain situations, known techniques for establishing a point-to-multipoint path include manually provisioning cross-connects at the nodes of the path. Manual provisioning, however, is typically not efficient.

SUMMARY OF THE DISCLOSURE

In accordance with the present invention, disadvantages and problems associated with previous techniques for provisioning point-to-multipoint paths may be reduced or eliminated.

According to one embodiment of the present invention, establishing a point-to-multipoint path includes establishing a first label switched path from a source to a first destination, where the first label switched path is represented by a first label set comprising first node-label pairs. A second label switched path is established from the source to a second destination, where the second label switched path is represented by a second label set comprising second node-label pairs. One or more of the second node-label pairs are equivalent to one or more of the first node-label pairs. The first label set and the second label set are combined to establish the point-to-multicast path.

Certain embodiments of the invention may provide one or more technical advantages. A technical advantage of one embodiment may be a point-to-multipoint path may be established by aggregating point-to-point paths. In the embodiment, point-to-point paths with a common source and different destinations are established. The point-to-point paths are combined to yield a point-to-multipoint path.

Another technical advantage of one embodiment may be that the paths may be established using the Generalized Multi-Protocol Label Switching (GMPLS) protocol. In some cases, the GMPLS protocol may efficiently establish the paths.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
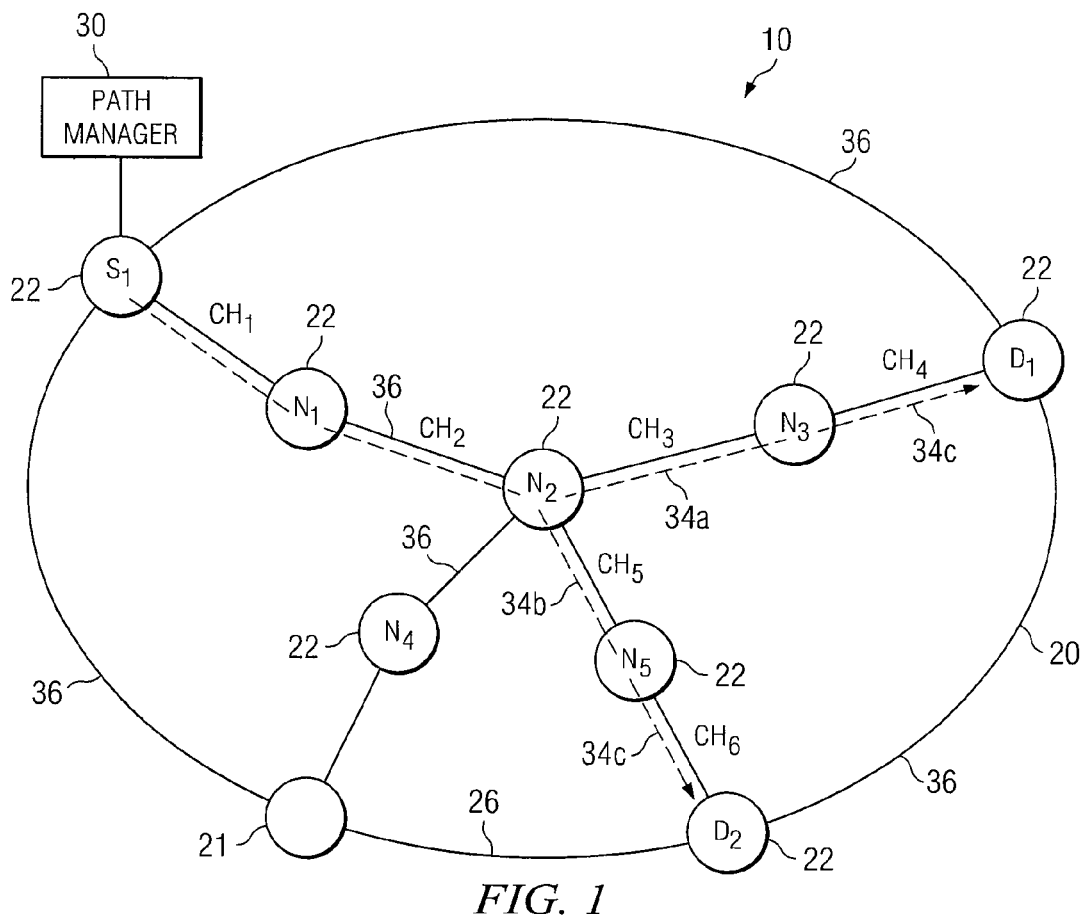
FIG. 1 is a block diagram illustrating a network system for which point-to-multipoint paths may be established according to one embodiment.
Figure 2:
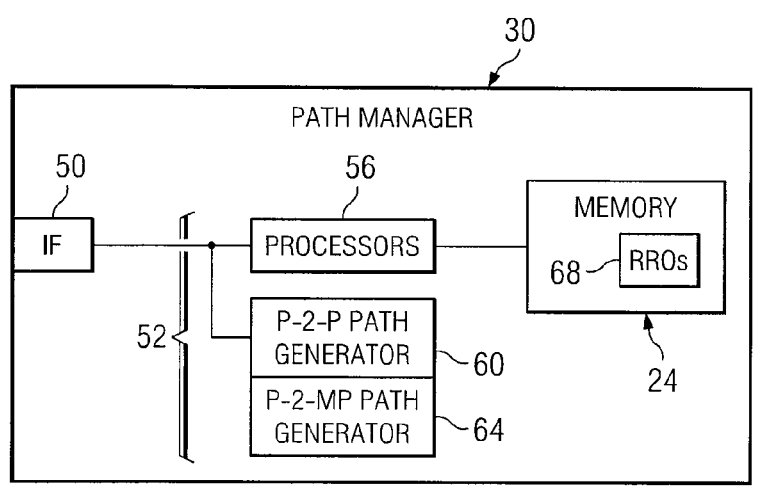
FIG. 2 illustrates one embodiment of a path manager that may be used with the system of FIG. 1.
Figure 3:
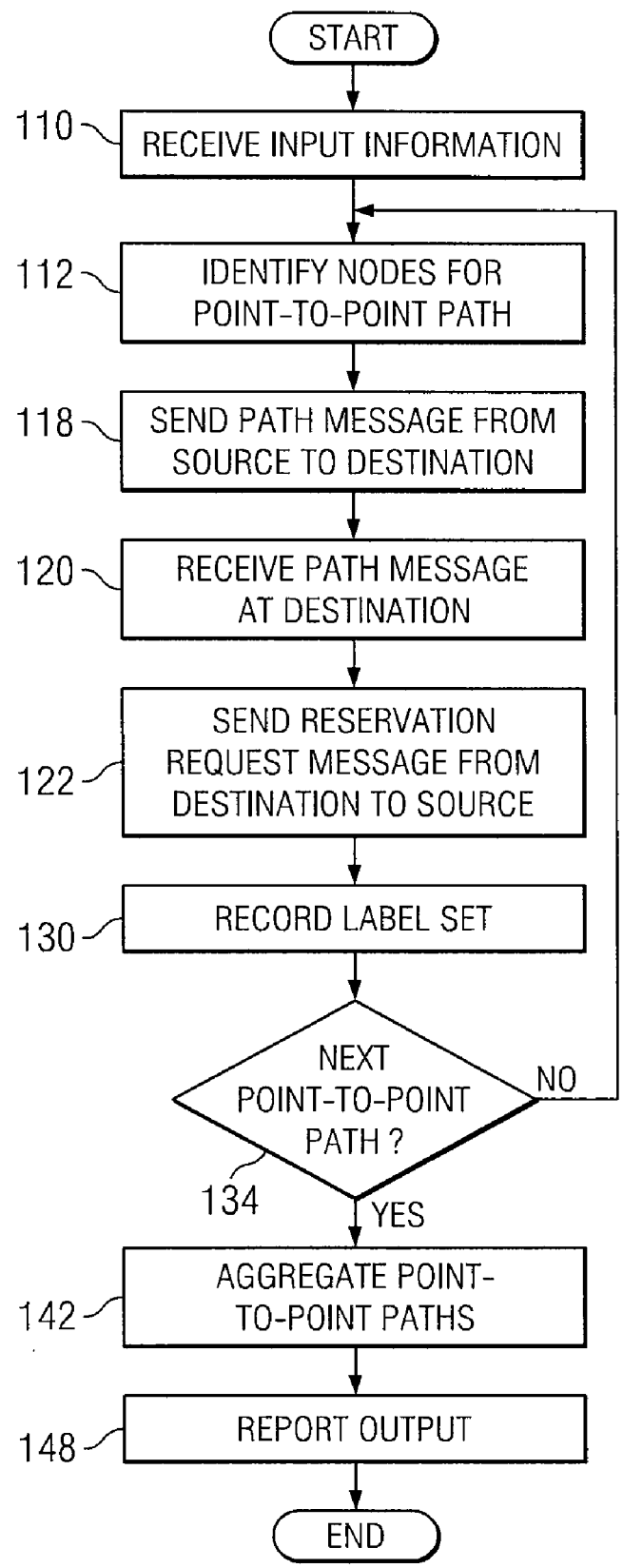
FIG. 3 illustrates one embodiment of a method for provisioning a point-to-multipoint path.

Embodiments of the present invention and its advantages are best understood by referring to FIGS. 1 through 3 of the drawings, like numerals being used for like and corresponding parts of the various drawings.

FIG. 1 is a block diagram illustrating a network system 10 for which a point-to-multipoint path may be established by aggregating point-to-point paths. In the embodiment, point-to-point paths with a common source and different destinations are established. The point-to-point paths are combined to yield a point-to-multipoint path. The paths may be established using the Generalized Multi-Protocol Label Switching (GMPLS) protocol. In some cases, the GMPLS protocol may efficiently establish the paths.

According to the illustrated embodiment, network system 10 includes a ring network 20. Ring network 20 includes nodes 22, fibers 26, and a path manager 30 coupled as shown. In one embodiment, ring network 20 communicates information through signals. A signal may comprise an optical signal transmitted as light pulses. As an example, an optical signal may have a frequency of approximately 1550 nanometers and a data rate of 10, 20, 40, or over 40 gigabits per second. A signal may comprise a synchronous transport signal (STS) that communicates information in packets. Information may include voice, data, audio, video, multimedia, control, signaling, and/or other information.

According to one embodiment, ring network 20 may comprise an optical fiber ring. Ring network 20 may utilize protocols such as Resilient Packet Ring (RPR) protocols, according to which packets are added, passed through, or dropped at each node 22. Ring network 20 may utilize any suitable routing technique, such as Generalized Multi-Protocol Label Switching (GMPLS) techniques. Ring network 20 may utilize any suitable transmission technique, such as Ethernet, Synchronous Optical Network (SONET), or wavelength division multiplexing (WDM) techniques.

In the illustrated embodiment, nodes 22 include source node $S_1$, destination nodes $D_1$ and $D_2$, and intermediate nodes $N_1$ through $N_5$. Nodes 22 include any suitable devices such as network elements operable to route packets through, to, or from ring network 20. Examples of network elements include routers, switches, wavelength division multiplexers (WDMs), access gateways, endpoints, softswitch servers, trunk gateways, access service providers, Internet service providers, or other device operable to route packets through, to, or from ring network 20.

Fibers 36 represent any suitable fibers operable to transmit a signal, such as optical fibers. A fiber 36 communicates one or more channels, where a channel represents a signal of a particular wavelength.

A path 34, or circuit, comprises a sequence of nodes 22 that communicate packets. Packets travel from a source node 22, through zero, one, or more intermediate nodes 22, to a destination node 22. A path 34 may be a point-to-point path with a source and destination or a point-to-multipoint 34 with a source and more than one destination. In the illustrated embodiment, paths 34 include point-to-point paths 34a and 34b. Path 34a goes from source $S_1$ to destination $D_1$, and path 34b goes from source $S_1$ to destination $D_2$. Point-to-multipoint path 34c goes from source $S_1$ to destinations $D_1$ and $D_2$.

According to one embodiment, path 34 is a label switched path that includes nodes 22 comprising Multi-Protocol Label Switching (MPLS) or Generalized MPLS (GMPLS) routers, or label switch routers. Path 34 from a source to a destination is designated by a label set corresponding to the source and destination. To route a packet along path 34, a label switch router affixes a label set to the packet based on the destination of the packet.

A label set comprises one or more node-label pairs. A node-label pair designates the next hop for a node 22 on a path 36. The pair includes a node identifier identifying the node 22 and a label identifying the outgoing channel for the next hop. Node-label pairs are equivalent if they identify the same node 22 and next hop.

Label sets for paths 34 may be designated by $(N_1-L_1, N_2-L_2, \ldots, N_n-L_n)$, where $N_i-L_i$ represents a node-label pair, $N_i$ identifies the node of the pair, and $L_i$ identifies the label of the pair. In the illustrated embodiment, path 34a may be designated by a label set $(S_1-Ch_1, N_1-Ch_2, N_2-Ch_3, N_3-Ch_4)$, and path 34b may be designated by a label set $(S_1-Ch_1, N_1-Ch_2, N_2-Ch_5, N_5-Ch_6)$, where $Ch_1$ represents a channel identified by a label $L_i$.

Path manager 30 may establish a point-to-multipoint path by aggregating point-to-point paths. In the embodiment, point-to-point paths with a common source and different destinations are established. The point-to-point paths are combined to yield a point-to-multipoint path. The paths may be established using the Generalized Multi-Protocol Label Switching (GMPLS) protocol. In some cases, the GMPLS protocol may efficiently establish the paths.

A device of system 10 may include logic, an interface, memory, other component, or any suitable combination of the preceding. Logic includes hardware, software, other logic, or any suitable combination of the preceding. Certain logic may manage the operation of a device, and may comprise, for example, a processor that executes instructions and manipulates data to perform operations.

An interface receives input, sends output, performs suitable processing of the input or output or both, or any combination of the preceding, and may comprise one or more ports, conversion software, or both. Memory stores and facilitates retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

Modifications, additions, or omissions may be made to network system 10 without departing from the scope of the invention. The components of network system 10 may be integrated or separated according to particular needs. Moreover, the operations of network system 10 may be performed by more, fewer, or other devices. Additionally, operations of network system 10 may be performed using any suitable logic. As used in this document, "each" refers to each member of a set or each member of a subset of a set.

FIG. 2 illustrates one embodiment of a path manager 30 that may be used with system 10 of FIG. 1. According to the illustrated embodiment, path manager 30 includes an interface (IF) 50, logic 52, and a memory 54. Logic 52 includes one or more processors 56, point-to-point (P2P) path generator 60, and point-to-multipoint path (P2MP) generator 64. Memory 24 stores record route objects (RROs) 68.

Point-to-point path generator 60 establishes point-to-point paths 34a-b according to any suitable protocol, such as the Resource ReSerVation Protocol-Traffic Engineering (RSVP-TE) and/or the GMPLS protocol. In one embodiment, point-to-point path generator 60 identifies nodes 22 of a path 34a-b.

Nodes 22 may be identified according to a constrained shortest path first (CSPF) procedure or may be programmed by a user.

In the embodiment, point-to-point path generator 60 then instructs a source node 22 to send a path message to the other nodes 22 of the path 34a-b. The path message describes requested resources, for example, bandwidth and quality of service requirements. The destination node 22 sends a reserve message that reserves the resources at the nodes 22. The reserve message may reserve resources, for example, channels that satisfy the requirements. Point-to-point path generator 60 generates a label set for the point-to-point path 34a-b, and stores the label set in a record route object 68.

Point-to-multipoint path generator 64 generates point-to-multipoint paths 34c by combining label sets of point-to-point paths 34a-b. Point-to-multipoint path generator 64 identifies point-to-point paths 34a-b with the same source and destinations for the desired point-to-multipoint path 34c. The point-to-point paths 34a-b have the same source, so their label sets include at least one equivalent node-label pair. Point-to-multipoint path generator 64 forms a label set for the point-to-multipoint path 34c from the union of the point-to-point path label sets to generate the point-to-multipoint path 34c. The resources of the point-to-point paths 34a-b are combined to form the point-to-multipoint path 34c.

Modifications, additions, or omissions may be made to path manager 30 without departing from the scope of the invention. The components of path manager 30 may be integrated or separated according to particular needs. Moreover, the operations of path manager 30 may be performed by more, fewer, or other devices. Additionally, operations of path manager 30 may be performed using any suitable logic.

FIG. 3 illustrates one embodiment of a method for provisioning a point-to-multipoint path. According to one embodiment, the method may be performed by path manager 30, which may send instructions to components of system 10 to perform the method.

The method begins at step 110, where path manager 30 receives input information. The input information may include the nodes 22 of paths 34. Nodes 22 may be discovered according to a CSPF procedure or programmed by a user.

Steps 112 through 130 describe setting up a point-to-point path 34 between a source and destination. Nodes 22 for a point-to-point path are identified in step 112. In the example, nodes $S_1, N_1, N_2, N_3$, and $D_1$ are identified for path 34a. The source sends a path message to the destination through the intermediate nodes at step 118. In the illustrated embodiment, the path message is sent from $S_1$, through $N_1, N_2$, and $N_3$, to $D_1$. The path message is used to establish the outbound channel, or wavelength, for each node except for the destination node. Each node 22 designates in the path message the channel that path 34 can use or indicates that there is no available channel. In the illustrated embodiment, $S_1$ designates $Ch_1$, $N_1$ designates $Ch_2$, $N_2$ designates $Ch_3$, and $N_3$ designates $Ch_4$, but $D_1$ does not designate a channel since it is the destination.

The destination receives the path message at step 120. The destination sends a reservation request message that includes the label set to the source at step 122. In the illustrated embodiment, the label set includes $(S_1-Ch_1, N_1-Ch_2, N_2-Ch_3, N_3-Ch_4, D_1)$. Path manager 30 records the label set in a record route object at step 130.

There may be a next point-to-point path to be used to form the point-to-multipoint path at step 134. In the illustrated embodiment, point-to-point path 34b, given by label set $(S_1-CH_1, N_1-Ch_2, N_2-Ch_3, N_5-Ch_6, D_2)$, is the next point-to-point path. If there is a next point-to-point path, the method returns to step 112, where the nodes 22 for the next point-to-point path are identified. In the example, nodes $S_1$, $N_2$, $N_5$, and $D_2$ are identified for path 34b.

If there is no next point-to-point path at step 134, the method proceeds to step 142. Point-to-point paths 34a-b are aggregated at step 142 to form point-to-multipoint path 34c. Paths 34a-b are aggregated by combining label sets of paths 34a-b yield a label set ($S_1$-$Ch_1$, $N_1$-$Ch_2$, $N_2$-$Ch_3$, $N_3$-$Ch_4$, $D_1$, $N_2$-$CH_5$, $N_5$-$Ch_6$, $D_2$) for path 34c. Path manager 30 reports the output at step 146. The output may include the label set for path 34c. After reporting the output, the method terminates.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be a point-to-multipoint path may be established by aggregating point-to-point paths. In the embodiment, point-to-point paths with a common source and different destinations are established. The point-to-point paths are combined to yield a point-to-multipoint path.

Another technical advantage of one embodiment may be that the paths may be established using the Generalized Multi-Protocol Label Switching (GMPLS) protocol. In some cases, the GMPLS protocol may efficiently establish the paths.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for establishing a point-to-multipoint path, comprising:
    establishing a first label switched path from a source to a first destination, the first label switched path represented by a first label set comprising a plurality of first node-label pairs;
    establishing a second label switched path from the source to a second destination, the second label switched path represented by a second label set comprising a plurality of second node-label pairs, one or more of the second node-label pairs equivalent to one or more of the first node-label pairs; and
    combining the first label set and the second label set to establish the point-to-multicast path.

2. The method of claim 1, wherein establishing the first label switched path from the source to the first destination further comprises:
    establishing the first label switched path according to Resource ReSerVation Protocol (RSVP).

3. The method of claim 1, wherein establishing the first label switched path from the source to the first destination further comprises:
    identifying one or more nodes of the first label switched path according to a constrained shortest path first (CSPF) procedure.

4. The method of claim 1, wherein establishing the first label switched path from the source to the first destination further comprises:
    establishing the first label switched path according to a Generalized Multi-Protocol Label Switching (GMPLS) procedure.

5. The method of claim 1, wherein establishing the second label switched path from the source to the second destination further comprises:
    establishing the one or more first node-label pairs of the first label set; and
    generating the second label set using the one or more first node-label pairs.

6. The method of claim 1, wherein a node-label pair of the first node-label pairs identifies:
    a node; and
    a channel associated with a next hop.

7. The method of claim 1, wherein combining the first label set and the second label set to establish the point-to-multicast path further comprises:
    combining one or more first resources associated with the first label switched path with one or more second resources associated with the second label switched path to establish the point-to-multicast path.

8. A path manager operable to establish a point-to-multipoint path, comprising:
    a memory operable to store a plurality of label sets; and
    one or more processors operable to:
        establish a first label switched path from a source to a first destination, the first label switched path represented by a first label set comprising a plurality of first node-label pairs;
        establish a second label switched path from the source to a second destination, the second label switched path represented by a second label set comprising a plurality of second node-label pairs, one or more of the second node-label pairs equivalent to one or more of the first node-label pairs; and
        combine the first label set and the second label set to establish the point-to-multicast path.

9. The path manager of claim 8, the one or more processors further operable to establish the first label switched path from the source to the first destination by:
    establishing the first label switched path according to Resource ReSerVation Protocol (RSVP).

10. The path manager of claim 8, the one or more processors further operable to establish the first label switched path from the source to the first destination by:
    identifying one or more nodes of the first label switched path according to a constrained shortest path first (CSPF) procedure.

11. The path manager of claim 8, the one or more processors further operable to establish the first label switched path from the source to the first destination by:
    establishing the first label switched path according to a Generalized Multi-Protocol Label Switching (GMPLS) procedure.

12. The path manager of claim 8, the one or more processors further operable to establish the second label switched path from the source to the second destination by:
    establishing the one or more first node-label pairs of the first label set; and
    generating the second label set using the one or more first node-label pairs.

13. The path manager of claim 8, wherein a node-label pair of the first node-label pairs identifies:
    a node; and
    a channel associated with a next hop.

14. The path manager of claim 8, the one or more processors further operable to combine the first label set and the second label set to establish the point-to-multicast path by:
   combining one or more first resources associated with the first label switched path with one or more second resources associated with the second label switched path to establish the point-to-multicast path.

15. Logic for establishing a point-to-multipoint path, the logic embodied in a non-transitory computer-readable medium and when executed by a computer operable to:
   establishing a first label switched path from a source to a first destination, the first label switched path represented by a first label set comprising a plurality of first node-label pairs;
   establishing a second label switched path from the source to a second destination, the second label switched path represented by a second label set comprising a plurality of second node-label pairs, one or more of the second node-label pairs equivalent to one or more of the first node-label pairs; and
   combining the first label set and the second label set [from the same source to both the first and second destinations] to establish the point-to-multicast path.

16. The logic of claim 15, further operable to establish the first label switched path from the source to the first destination by:
   establishing the first label switched path according to Resource ReSerVation Protocol (RSVP).

17. The logic of claim 15, further operable to establish the first label switched path from the source to the first destination by:
   identifying one or more nodes of the first label switched path according to a constrained shortest path first (CSPF) procedure.

18. The logic of claim 15, further operable to establish the first label switched path from the source to the first destination by:
   establishing the first label switched path according to a Generalized Multi-Protocol Label Switching (GMPLS) procedure.

19. The logic of claim 15, further operable to establish the second label switched path from the source to the second destination by:
   establishing the one or more first node-label pairs of the first label set; and
   generating the second label set using the one or more first node-label pairs.

20. The logic of claim 15, wherein a node-label pair of the first node-label pairs identifies:
   a node; and
   a channel associated with a next hop.

21. The logic of claim 15, further operable to combine the first label set and the second label set to establish the point-to-multicast path by:
   combining one or more first resources associated with the first label switched path with one or more second resources associated with the second label switched path to establish the point-to-multicast path.

22. A system for establishing a point-to-multipoint path, comprising:
   means for establishing a first label switched path from a source to a first destination, the first label switched path represented by a first label set comprising a plurality of first node-label pairs;
   means for establishing a second label switched path from the source to a second destination, the second label switched path represented by a second label set comprising a plurality of second node-label pairs, one or more of the second node-label pairs equivalent to one or more of the first node-label pairs; and
   means for combining the first label set and the second label set to establish the point-to-multicast path.

* * * * *